J. C. B. WOOD.
PRUNING IMPLEMENT.
APPLICATION FILED APR. 6, 1915.
1,179,595.
Patented Apr. 18, 1916.
2 SHEETS—SHEET 2.
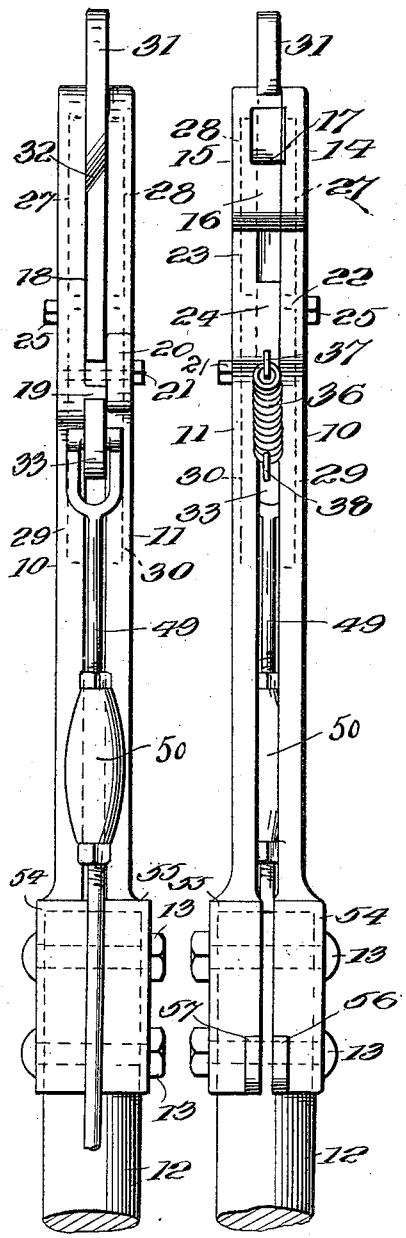
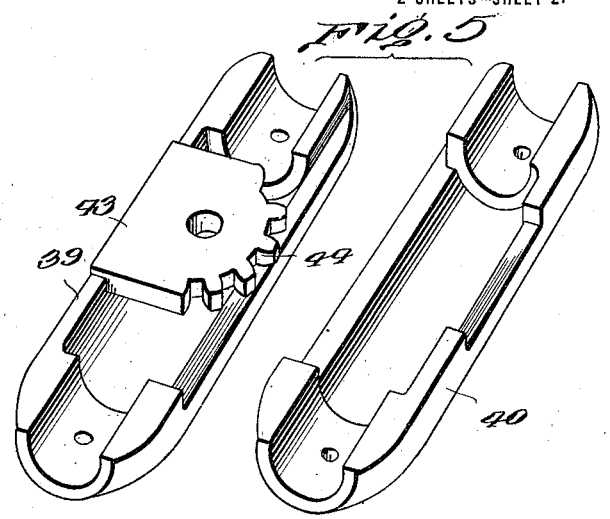
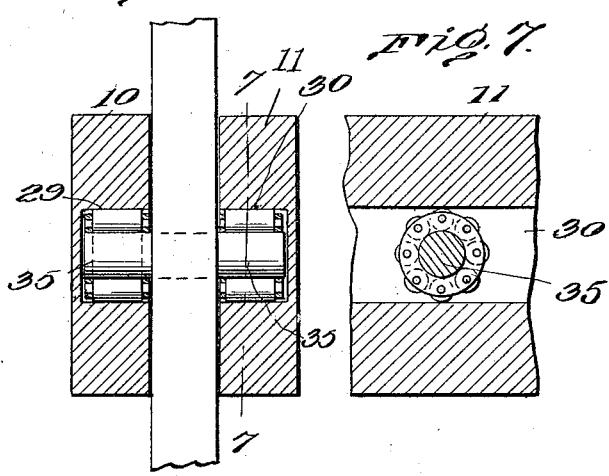
Inventor
J. C. B. Wood

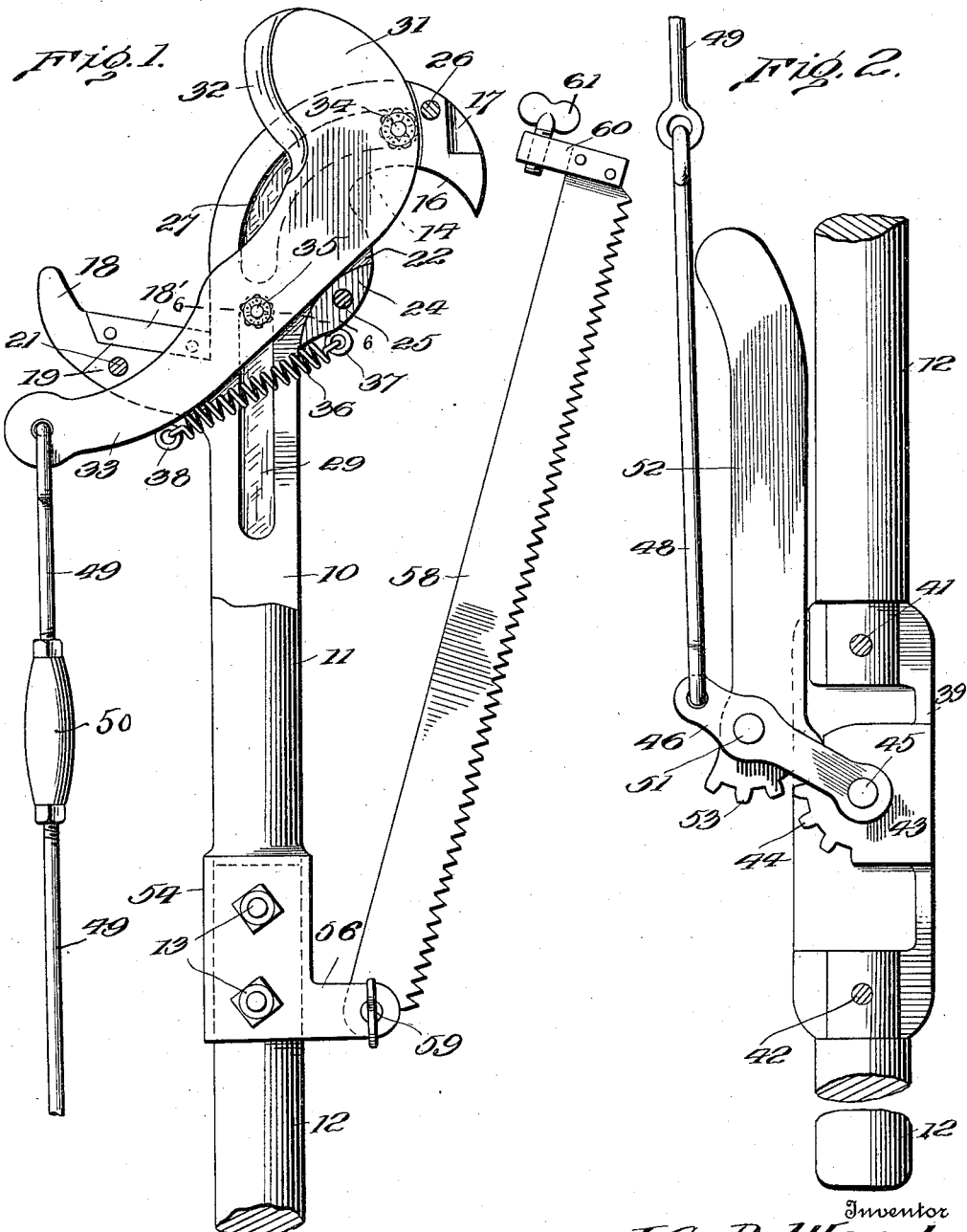

UNITED STATES PATENT OFFICE.

JOHN C. B. WOOD, OF HUNTINGTON, WEST VIRGINIA, ASSIGNOR OF ONE-HALF TO GEORGE JUSTICE, OF LOGAN, WEST VIRGINIA.

PRUNING IMPLEMENT.

1,179,595.  Specification of Letters Patent.  Patented Apr. 18, 1916.

Application filed April 6, 1915. Serial No. 19,502.

*To all whom it may concern:*

Be it known that I, JOHN C. B. WOOD, citizen of the United States, residing at Huntington, in the county of Cabell and State of West Virginia, have invented certain new and useful Improvements in Pruning Implements, of which the following is a specification.

This invention relates to implements employed for pruning trees and for like purposes, and has for one of its objects to improve the construction and increase the efficiency and utility of a device of this character.

Another object of the invention is to provide an implement combining a limb severing portion and a portion for removing the severed limbs from the tree.

Another object of the invention is to provide an implement of this character having a saw attachment.

With these and other objects in view the invention consists in certain novel features of construction as hereinafter shown and described and then specifically pointed out in the claims; and in the drawings illustrative of the preferred embodiment of the invention—

Figure 1 is an elevation partly in section of the upper portion of the improved device illustrating the construction with the saw released at one end. Fig. 2 is an elevation of the lower portion of the improved device illustrating the construction and with one portion of the casing detached. Fig. 3 is an edge view from the cutting side. Fig. 4 is an edge view from the hook side with the saw detached. Fig. 5 represents the casing for the operating lever with the parts in perspective and separated. Fig. 6 is an enlarged transverse section on the line 6—6 of Fig. 1. Fig. 7 is a transverse section on the line 7—7 of Fig. 6.

Corresponding and like parts are referred to in the following description and indicated in all the views of the drawings by the same reference characters.

The improved implement comprises a head portion having a severing knife or blade and a handle or stock, a casing connected to the stock within reach of the operator and containing an operating lever whereby the severing blade is actuated, and a saw adapted to be attached when required.

The head portion of the improved implement comprises two side members 10—11 spaced apart and connected at their lower ends to the handle portion 12 of any suitable length. The lower ends of the side members 10—11 are formed into half sockets 54 and 55 to engage the upper end of the handle member 12 which is bolted or otherwise secured thereto as represented at 13. At their upper ends the members 10—11 are extended into hooks 14—15, one of the hook members, for instance the hook member 15, being provided with a spacer block 16, which conforms in outline to the points or bills of the hooks and is provided with an outwardly opening recess 17.

The portions of the confronting faces of the hooks 14—15 opposite the recess 17 are likewise recessed to increase the width, as shown in Fig. 4. At the side opposite from the hooks 14—15 is a curved cutting jaw 18 extending from one of the members, preferably the member 10, and having a lateral lug 19 directed inwardly therefrom, and extending from the other member 11 is a lug 20 against which the lug 19 bears, the lugs 19—20 co-acting to receive a holding screw or other suitable fastening device 21. Extending from the edges of the members 10—11 at the same side as the hooks 14—15 are other lugs or projections 22—23. One of the projections, for instance the projection 23, is provided with a lateral lug 24 which serves as a spacer between the projections 22—23 and likewise operating to receive a bolt or other suitable fastening device 25. A holding screw or other fastening device 26 extends through the hook portions 14—15 and likewise through the lug 16. By this means the members 10—11 are maintained rigidly in separated relation with their confronting faces in parallel relation throughout.

Formed in the confronting faces of the curved or hooked portions 14—15 of the members 10—11 are slots 27—28, preferably "blind", the curvature of the slots preferably conforming to the curvature of the hooked portions. Formed in the confronting faces of the members 10—11 are other slots 29—30, also preferably blind. Slidably disposed between the members 10—11 is a severing member including a head portion 31 having a cutting edge 32 and a stock portion 33. Fitting through the severing member at the juncture of the head 31 and the stock 33 is a pin 34 which bears at its terminals respectively in the slots 27—28, while a similar pin 35 extends through the stock 33 intermediate its ends and bears at its terminals respectively in the slots 29—30.

The pins 34 and 35 are preferably surrounded by bearing rollers as shown to reduce the friction. A spring 36 is connected at one end at 37 preferably to the lug 24, and at the other end at 38 to the stock 33, and exerts its force to hold the severing member 31—33 yieldably in its withdrawn position or in the position shown in Figs. 1 and 2, with the pins 34—35 in the outer ends of the slots 27—28 and 29—30. By this arrangement when a pulling force is applied to the free end of the stock 33 the pin 35 will travel down the slots 29—30, while the pin 34 will likewise travel within the curved slots 27—28 and cause the cutting edge 32 of the severing member to move toward the stationary cutting member 18 and coact with the latter to sever the limb as will be more fully explained, and when the pulling force is released the spring 36 will then return the severing member automatically to its inoperative position.

At its lower end the handle member 12 is divided and connected into the opposite ends of a casing which contains an operative lever and its attachments. The casing is formed in two parts 39—40 having half sockets at the ends to engage around the confronting terminals of the divided handle and secured in position by bolts or other suitable fastening devices 31—42. The portion of the handle member below the casing 39—40 constitutes a hand grip, as will be obvious.

The casing 39—40 is hollow and open at one side and provided with a lug 43, preferably integral with one of the casing members, for instance the member 39, and is formed with a gear segment 44. Pivoted at 45 upon opposite sides of the lug 43 are radius bars, one of which is shown at 46, with a bail 48 connected at one end thereto. A pull rod 49 is connected at one end to the bail and at the other end to the free end of the stock 33 of the severing member. An adjusting turn buckle 50 is connected into the pull rod to control its length, as shown.

Pivoted at 51 between the radius bars 46 is an operating lever 52 having a gear segment 53 co-acting with the gear segment 44 of the lug 43. The lever 52 it will be noted operates through the bail 48. The parts will be so arranged that when the operating lever 52 is in its upper position as shown in Fig. 2, the severing member 33 will be moved into its upper position as shown in Figs. 1 and 3, and then when the lever arm 52 is moved downwardly the radius bars 46 will be moved downwardly therewith and exert a pulling force upon the severing member and thus cause the cutter to operate as before described. Then when the lever 52 is released the spring 36, as before stated, will automatically return the severing member to its upper or inoperative position.

The portion of the stock 33 between the pin 35 and the terminal to which the pull member 49 is attached, forms an arm projecting normally beyond the members 10—11, and the pin 35 serves as an immovable fulcrum, so that when a pull force is applied to the member 49 the movable cutter member is caused to operate with a strong leverage action which materially increases the effectiveness of the implement.

The stationary jaw 18 is preferably provided with a ledger plate 18′ of tempered steel, which may be readily renewed when worn, or sharpened when dulled.

The severing member 31—33 fits relatively close between the confronting faces of the members 10—11, so that the cutting edge 32 coöperates with the severing edge of the ledger plate 18′ of the stationary member 18.

Extending from the socket members 54—55 are ears 56—57 between which a saw 58 is pivoted at 59. At its upper end the saw is provided with a bearing member 60 projecting therefrom at one end for engagement in the recess 17, and provided with a clamp screw 61 bearing against the inner face of the recess to enable strain to be applied longitudinally of the saw to hold the same in position. When thus arranged, the saw can be employed for severing larger limbs, and those which are too large to be operated on by the severing member 31—33. When not required, the clamp screw 60 is released, which enables the saw to be swung downwardly, thus leaving the hooked terminals 14 and 15 free to be employed for engaging the limb to be severed.

The hooked portions 14—15 serve a threefold purpose, first to receive the grooves or guides 27—28; second, a support for the outer end of the saw 58, and, third, a convenient means for removing severed limbs from the tree.

The improved implement is simple in construction, and can be inexpensively and strongly manufactured of any suitable material.

Having thus described the invention, what is claimed as new is:

1. In an implement of the class described, a stock having a stationary cutter extending laterally therefrom at one side and provided with longitudinally directed guide slots and laterally curving guide slots, a member having a cutting edge at one end coacting with the stationary cutter and movable relative to the stock, lateral bearings near one end of said member and slidably engaging in the curved slots, lateral bearings intermediate the ends of said movable member, and slidably engaging in the longitudinally directed slots, and an operating device connected to the movable member at the end opposite to the cutting edge thereof, whereby a leverage force is applied to the movable member when actuated.

2. In an implement of the class described, a handle formed of coacting sections, stem severing devices at one end of one of said sections, a longitudinally divided casing connected to the confronting ends of said handle sections, a gear segment carried by one of said casing sections and directed between the same, radius members mounted to swing upon said segment, a pull member connected to said radius members and adapted to operatively engage said stem severing devices, and a lever arm pivoted to said radius members and having a gear segment engaging with the segment of the handle casing.

3. In an implement of the class described, a handle formed of coacting sections, a stationary cutter carried by one of the handle sections, a movable cutter coacting with the stationary cutter, a longitudinally divided casing connected to the confronting ends of said handle sections, a gear segment carried by one of said casing sections and directed between the same, radius members mounted to swing upon said segment, a pull member connected to said radius members and to said movable cutter, and a lever arm pivoted to said radius members and having a gear segment engaging with the segment of the handle casing.

4. In an implement of the class described, a handle portion having a stationary cutter, a movable cutter coacting with the stationary cutter, a divided casing connected to said handle portion, a gear segment connected to one portion of said casing at its rear edge and extending between the casing portions, a radius device pivoted to said gear segment, connecting means between said radius device and the movable cutter, and a lever arm pivoted to said radius device and having a gear segment engaging the gear segment of the casing.

5. In an implement of the class described, a handle portion having a stationary cutter, a movable cutter coacting with the stationary cutter, a divided casing connected to said handle portion, and provided respectively with half sockets engaging the divided handle, a gear segment connected to one portion of said casing and extending between the casing portions, a radius device pivoted to said gear segment, connecting means between said radius device and the movable cutter and a lever arm pivoted to said radius device and having a gear segment engaging the gear segment of the casing.

6. In an implement of the class described, a stock having a laterally directed stationary cutter and guide slots one portion of which curves away from the stationary cutter, a member movable relative to said stock and having a laterally directed cutter coöperating with the stationary cutter, bearings spaced apart and located near one end and intermediate the ends of said movable member and operating in said slots, and an operating element engaging said movable member at the end opposite to its laterally directed cutter and exerting a leverage force upon the movable member and its cutter.

7. In an implement of the class described, a stock having a laterally directed stationary cutter and guide slots one portion of which curves away from the stationary cutter, a member movable relative to said stock and having a laterally directed cutter coöperating with the stationary cutter and extended at one end to constitute a longitudinally directed arm, bearings carried by said movable member and operating in said slots, and an operating element engaging the arm portion of said movable member and exerting a leverage force upon the movable member and its cutter.

In testimony whereof I affix my signature in presence of two witnesses.

JOHN C. B. WOOD. [L. S.]

Witnesses:
ROBERT R. STRATON,
W. CLYDE SENTER.

Copies of this patent may be obtained for five cents each, by addressing the "Commissioner of Patents, Washington, D. C."